United States Patent
Gagnon et al.

(10) Patent No.: US 6,257,081 B1
(45) Date of Patent: Jul. 10, 2001

(54) TRANSMISSION SYSTEM FOR A STRADDLE TYPE VEHICLE

(75) Inventors: Claude Gagnon, Magog (CA); Johann Holzleitner, Gunskirchen (AT); Roger Rioux, Magog (CA)

(73) Assignee: Bombardier Inc., Valcourt ( * ) Notice: Subject to any disclaimer, the term of this patent is extended or adjusted under 35 U.S.C. 154(b) by 0 days.

(21) Appl. No.: 09/338,637

(22) Filed: Jun. 23, 1999

Related U.S. Application Data (63) Continuation-in-part of application No. 08/958,758, filed on Oct. 25, 1997, now abandoned.

(51) Int. Cl.[7] .................................................. F16H 59/12
(52) U.S. Cl. ......................... 74/335; 74/483 PB; 477/63
(58) Field of Search ................. 74/336 R, 335, 74/483 PB; 475/275; 192/3.58, 3.61; 477/63, 80, 122

(56) References Cited

U.S. PATENT DOCUMENTS

| | | | |
|---|---|---|---|
| 4,497,222 | 2/1985 | Naganoka et al. | 74/866 |
| 4,519,273 | 5/1985 | Shimizu et al. | 74/752 |
| 4,602,528 | 7/1986 | Bailey | 74/861 |
| 4,690,008 | 9/1987 | Klatt | 74/336 R |
| 4,821,590 | 4/1989 | Tury et al. | 74/335 |
| 4,827,802 | 5/1989 | Marier | 74/866 |
| 4,860,607 | 8/1989 | Numazawa et al. | 74/330 |
| 5,097,726 | 3/1992 | Asada | 74/886 |
| 5,134,903 | 8/1992 | Itoh | 74/886 |
| 5,172,603 | 12/1992 | MacInnis | 74/473 |
| 5,205,180 | 4/1993 | Moroto et al. | 74/473 R |
| 5,299,652 | 4/1994 | Bevins | 74/473 |
| 5,411,448 | 5/1995 | Horri et al. | 477/102 |
| 5,419,412 | 5/1995 | Schwab et al. | 180/336 |
| 5,425,686 | 6/1995 | Grange | 74/473 |
| 5,515,940 | 5/1996 | Shichinohe et al. | 180/376 |
| 5,521,818 | 5/1996 | Palansky et al. | 364/424 |
| 5,636,608 | 6/1997 | Shichinohe et al. | 123/197 |
| 5,657,830 | 8/1997 | Kawashima et al. | 180/220 |
| 5,662,549 | 9/1997 | Kondo et al. | 477/122 |
| 5,666,863 | 9/1997 | Sunada et al. | 74/731.1 |
| 5,738,607 | 4/1998 | Kondo et al. | 477/125 |
| 5,873,802 | 2/1999 | Tabata et al. | 477/96 |

FOREIGN PATENT DOCUMENTS

3-229055  11/1991  (JP).

*Primary Examiner*—Charles A Marmor
*Assistant Examiner*—Ha Ho
(74) *Attorney, Agent, or Firm*—Pillsbury Winthrop LLP (57) ABSTRACT

A transmission system for a straddle vehicle which provides two operating modes, namely semi-automatic and automatic. With the semi-automatic transmission system, an operator only uses a switching means mounted on a steering bar of the vehicle for activating a clutch actuator and a shift actuator. The clutch actuator disengages a transmission clutch while the shift actuator operates a shifter for changing the transmission ratio. With the automatic transmission system, an Electronic Control Unit reads inputs signals such as speed of the engine (RPM), speed of the vehicle, opening of a throttle valve and position of a shifter and accomplishes a smooth shifting by activating a clutch actuator, a shift actuator and a modulated controlling valve.

10 Claims, 9 Drawing Sheets

TRANSMISSION SYSTEM FOR A STRADDLE TYPE VEHICLE

This application is a continuation-in-part application of Ser. No. 08/958,758 filed Oct. 25, 1997 now abandoned.

FIELD OF THE INVENTION

The invention relates to a transmission system for a vehicle such as a straddle type vehicle or the like.

BACKGROUND OF THE INVENTION

Internal combustion engines generally installed in vehicles such as straddle type vehicles or the like develop their power output at high speeds of rotation. It is therefore necessary to reduce the speed between the crankshaft and the shaft which drives the wheels. In addition, the torque that the engine delivers can be varied only within narrow limits. For this reason it is necessary to be able to alter the transmission ratio, so that the driving forces applied to the wheels of the straddle type vehicle can be adapted to varying road resistance conditions.

The speed reduction can be obtained by means of a transmission (change-speed gearbox) interposed between a clutch and a final drive. Such a transmission alters the torque that is transmitted. The transmission may include a main shaft, a secondary shaft and an output shaft (connected to the wheels). A multiple disk transmission clutch may be mounted on one end of the main shaft and a dog clutch body, or shift fork, may be slidably mounted on a shaft for changing the transmission gear ratio.

When an operator wants to start the straddle type vehicle with a manual transmission, he has to increase the speed of the engine, gradually depress a clutch lever and move a toe shift pedal in order to engaged the first gear train of the transmission. Having the first speed gear train engaged and increasing the speed, the operator has to depress the clutch lever for disengaging the transmission clutch and move the toe shift pedal in order to change the transmission gear ratio of the engine. Because operation of the clutch lever or toe shift pedal may be disagreeable or difficult, some prior transmission systems have been developed wherein the clutch lever is not present or wherein operation of the toe shift pedal is eased.

U.S. Pat. No. 3,894,442 discloses a semi-automatic gear shifting apparatus for shifting gears in a gear box of a motorcycle. The gears are shifted by rotating a spindle. The spindle is operably connected to a ratchet-type gear shifting means. A lever arm is connected at one end to the spindle and is connected at its other end to a toe pedal of a motorcycle shifting lever arm. A solenoid is mounted on the engine of the motorcycle by means of a mounting bracket. A solenoid connecting rod is operably connected to a core of the solenoid. The rod is operably connected at one end to the toe pedal. The rod is thus reciprocated to move the lever arm and the spindle by the solenoid which is actuated by a pair of push button switches connected to an electrical power source. The spindle is rotated through a relatively small arc. The degrees of the arc are determined by the distance the ratchet is required to move to effect a change in the gears on the gear box.

The semi-automatic gear shifting apparatus is activated when energized selectively through the switches. Each time the apparatus is activated one gear shifting cycle is completed. When the apparatus is de-activated, the lever arm is returned to the neutral position. The use of a gear disengaging clutch (and a clutch lever) is not required here because the movement of the shifting lever arm is sufficiently rapid so as to not damage the gears while effecting the gear shift.

However, experience has shown that under certain operating conditions, the movement of the shifting lever arm may be difficult and a very powerful solenoid is thus required. Moreover, having an exposed solenoid mounted on the engine may be hazardous because its operation may be jeopardized by roadway debris or impediments during driving.

U.S. Pat. No. 5,299,652 discloses a handlebar control system for a motorcycle which enables control of a motorcycle without moving the hands from the handlebars. A shift switch with an up-shift button and a downshift button is provided on a right handlebar while the left handlebar has a normal clutch lever mounted thereon. An advanced shift arm is connected at one end to a shift rod while the other end is connected to an actuator whereby, in operation, the actuator causes movement of the shift arm in order to change the transmission gear ratio. The system also comprises an air compressor which maintains an operating pressure of about 100 p.s.i., a tank, a pneumatic line, an up-shift control solenoid, a downshift control solenoid and an electric circuit connected to a twelve volt battery.

In operation an operator depresses the clutch lever and then the up-shift button which causes the up-shift control solenoid to open to permit a burst of air to flow to the actuator in order to change the transmission gear ratio. Downshifting occurs by pushing the downshift button. The system may also comprise an optional pneumatic kill switch for operating the transmission without using the clutch lever. However, this system requires a lot of space and is not adapted to be mounted in a restrictive area. Moreover, having an exposed actuator may be hazardous because its operation may be jeopardized by roadway debris during driving.

Finally, prior art semi-automatic transmission installed on the straddle type vehicle has some inconveniences such as it still requires the operation of a shift toe pedal. This operation may be difficult because an important effort is required from the operator when the temperature is below a certain point. Also, for an operator who wears large boots, operation of a shift toe pedal may be complicated.

Thus, there is a need in the industry to provide a user-friendly transmission system which eliminates the shift toe pedal.

SUMMARY OF THE INVENTION

It is an object of the present invention to provide a semi-automatic transmission system which eliminates the toe pedal.

It is an object of the present invention to provide an user-friendly semi-automatic transmission system offering a smooth shifting and a switching device mounted on a steering bar.

It is an object of the present invention to provide an automatic transmission system which eliminates the toe pedal and offers automatic shifting in accordance with the conditions of operations of a straddle type vehicle.

The invention seeks to provide a semi-automatic transmission system for a straddle type vehicle which comprises a body frame supported by front and rear wheels, a seat supported above said frame and a power unit supported by said frame below said seat, said transmission system comprised in said power unit and includes:

a switching means with an up-shift and a downshift button mounted on a steering bar wherein, in operation, depression of said up-shift button generates an input UO and depression of said downshift button generates an input DO;

a transmission clutch mounted on one end of a main shaft of an engine;

a transmission having at least two speed gear trains wherein a shifter means is mounted for changing from one speed gear train to another speed gear train;

a shift actuating means for operating said shifter means;

a clutch actuating means for operating said transmission clutch;

wherein, in operation, when one of said inputs UO and DO is generated, said clutch and said shift actuating means are activated wherein said transmission clutch is disengaged while shifting is accomplished by said shifter means; said shifter means being moved and positioned to either gear train based on the generated input.

The invention further seeks to provide an automatic transmission system for a straddle type vehicle which comprises a body frame supported by front and rear wheels, a seat supported above said frame and a power unit supported by said frame below said seat, said transmission system comprised in said power unit and includes:

a transmission clutch mounted on one end of a main shaft of an engine, said engine when activated, producing an input N indicate of engine speed and a throttle opening input A indicative of said throttle opening;

a transmission having at least two speed gear trains wherein a shifter means is mounted for changing from one speed gear train to another speed gear train;

a positioning means for determining the position of the shifter means, said positioning means generating an input T;

a shift actuating means for operating said shifter means;

a clutch actuating means for operating said transmission clutch;

a modulated controlling means connected to the clutch actuating means; and an Electronic Control Unit (ECU), connected to said shift actuating means, said clutch actuating means and said modulated controlling means;

wherein, in operation, an input N is provided to said ECU and is proportional to the speed of said engine, an input V is provided to said ECU which varies with speed of the vehicle and (a) while said ECU is reading input T and determines said input N being between two predetermined values, said input A being between two predetermined values, and said input V having reached a predetermined value; said clutch and said shift actuating means are activated by said ECU wherein said transmission clutch is disengaged while shifting is accomplished by said shifter means; said shifter means being moved and positioned to either gear train based on the generated input and (b) while input T is read by the ECU and indicates shifting is complete, said ECU reads said inputs N and V and deactivates said clutch actuating means and said shift actuating means, and activates said modulated controlling means wherein an appropriate amount of slippage is permitted between said transmission clutch and said main shaft during engagement of said transmission clutch.

In a preferred embodiment of the present invention, the novel semi-automatic transmission system comprises a switching means mounted on a steering bar of a straddle type vehicle. The switching means has up-shift, down-shift and operating mode buttons. The semi-automatic transmission system also comprises a SC (Solenoid-Clutch) connected to a multiple disk transmission clutch mounted on one end of a main shaft of the vehicle engine and a SS (Solenoid-Shift) operatively connected to a shift drum and a shift forks, such shift forks move in order to change the transmission ratio of the transmission. Once an operator depresses one of the up-shift or downshift button, the SC and the SS are activated, the transmission clutch is then disengaged and the shift forks moved in order to change the transmission ratio. Thus, the shifting occurs while the transmission clutch is disengaged.

In a preferred embodiment of the present invention, the novel automatic transmission system comprises a ECU which reads a plurality of inputs signals such as input V which varies linearly with the vehicle speed; input N which varies linearly with the engine speed (RPM); an input A which varies with the throttle opening and an input T which varies with the position of the shift forks.

One or more of the input signals to the ECU is\are used by the ECU to generate four output signals: an output CS for activating a clutch actuating means; output US and DS for activating a shift actuating means and an output MV for activating a modulated controlling means.

Other objects and features of the invention will become apparent by reference to the following specification and to the drawings.

BRIEF DESCRIPTION OF THE DRAWINGS

A detailed description of the preferred embodiment of the invention is provided herein with reference to the following drawings, wherein.

DETAILED DESCRIPTION OF PREFERRED EMBODIMENTS

Figure 1:
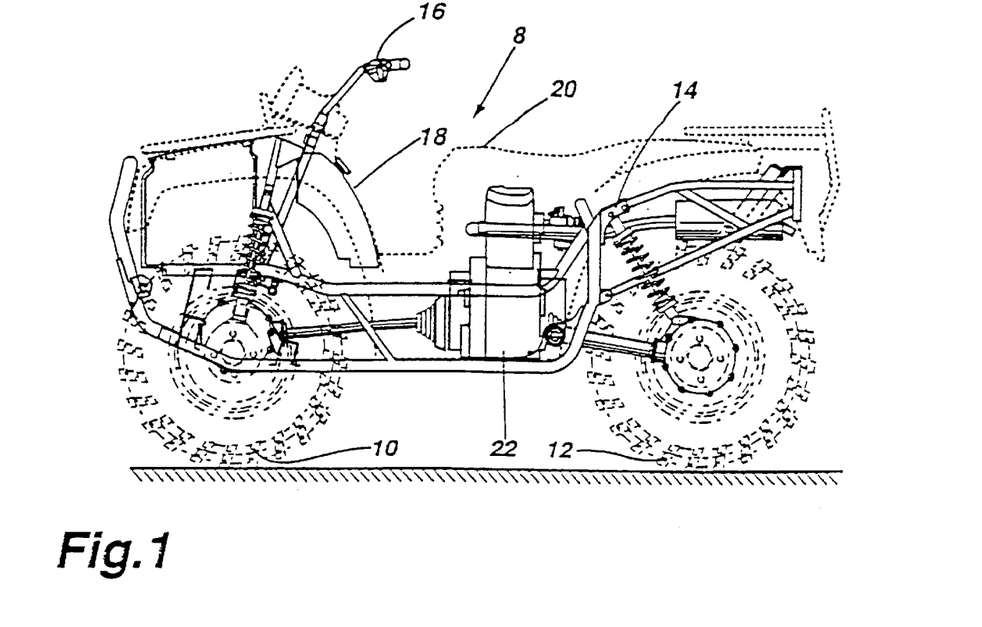
FIG. 1 is a side elevational view of a straddle type vehicle.

FIG. 1 illustrates a straddle type vehicle 8 wherein a pair of front wheels 10 and a pair of rear wheels 12 are suspended on the front end and on the rear end respectively of a body frame 14. A steering bar 16, a tank 18 and a seat 20 are mounted on the frame 14 from the front to the rear. A power unit 22 for driving the front wheels 10 and the rear wheels 12 is mounted on the frame 14.

Figure 2:
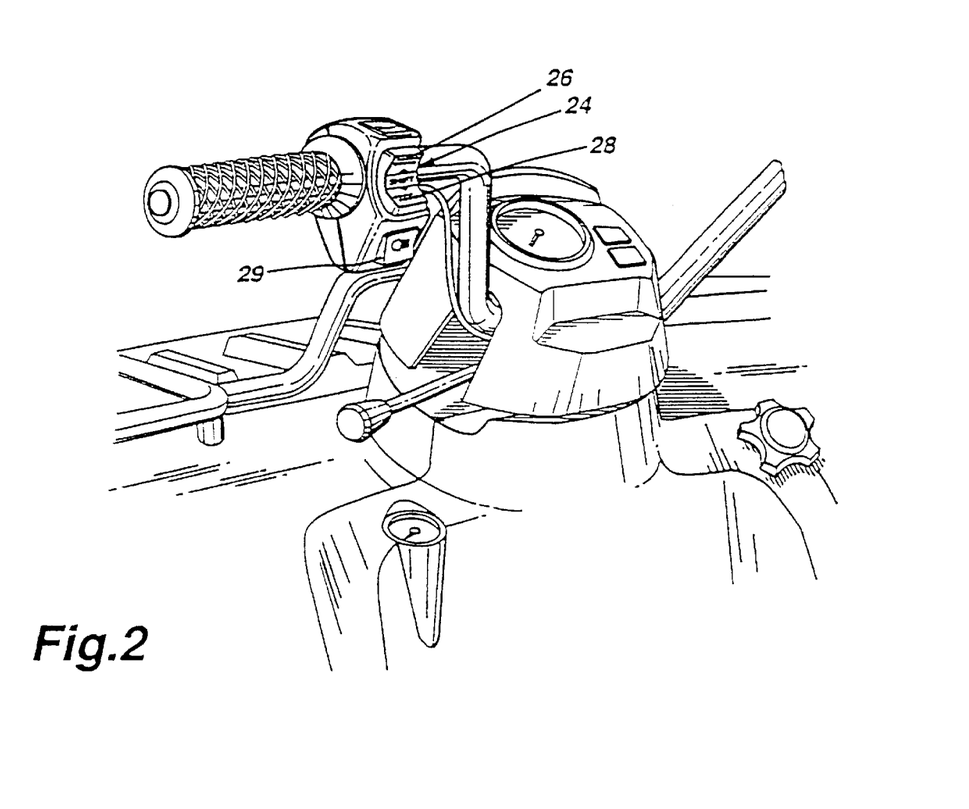
FIG. 2 is a partial perspective view of a steering bar of the vehicle showing a switching means with up-shift, downshift and operating-mode buttons.

Referring now to FIG. 2, a switching mechanism is indicated at 24 and comprises an up-shift momentary contact button switch 26 and a downshift momentary contact button switch 28 of the type wherein an electrical circuit is closed when the buttons 26 or 28 are depressed and opened when the buttons are not depressed. Each of the buttons 26 and 28 has a power source lead wire (not shown) electrically attached thereto and connected to a power source (not shown), and each of the switches has a solenoid or an Electronic Control Unit (ECU) connecting lead wire (not shown). The switching mechanism 24 has an operating-mode button 29 which permits to an operator to select between a semi-automatic transmission system and an automatic transmission system.

Figure 3:
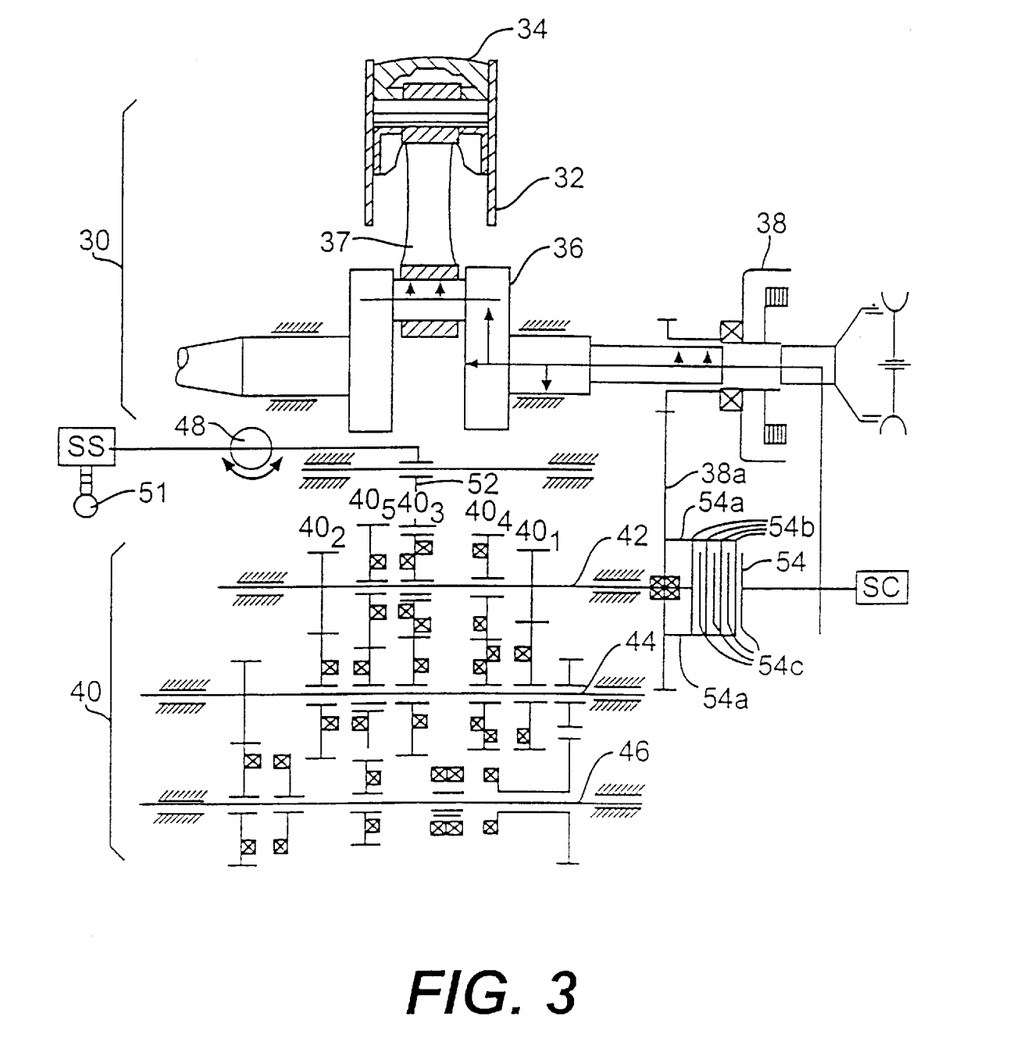
FIG. 3 is a diagrammatic view wherein a semi-transmission system constructed in accordance with the invention is illustrated.

As illustrated in FIG. 3, an engine 30 comprises a cylinder 32, a piston 34 slidably mounted in the cylinder 32, a crankshaft 36 and a connecting rod 37 interconnecting the piston 34 and the crankshaft 36. A centrifugal starting clutch 38 is mounted on a front end of the crankshaft 36. A transmission 40 is integrated with the engine 30 wherein a casing (not shown) serves both as a crankcase for the engine 30 and a transmission case for the transmission 40. The engine 30 and the transmission 40 thus form the power unit 22.

The transmission 40 has a main shaft 42, a secondary shaft 44 and an output shaft 46. A shift drum 48 is connected to a shift forks 52. Shift forks 52 are operated for changing the gear ratio of the transmission 40. The transmission 40 thus includes a first speed gear train $40_1$, a second speed gear train $40_2$, a third speed gear train $40_3$, a fourth speed gear train $40_4$ and a fifth speed gear train $40_5$. A multiple disk transmission clutch 54 is mounted on one end of the main shaft 42.

Figure 3A:
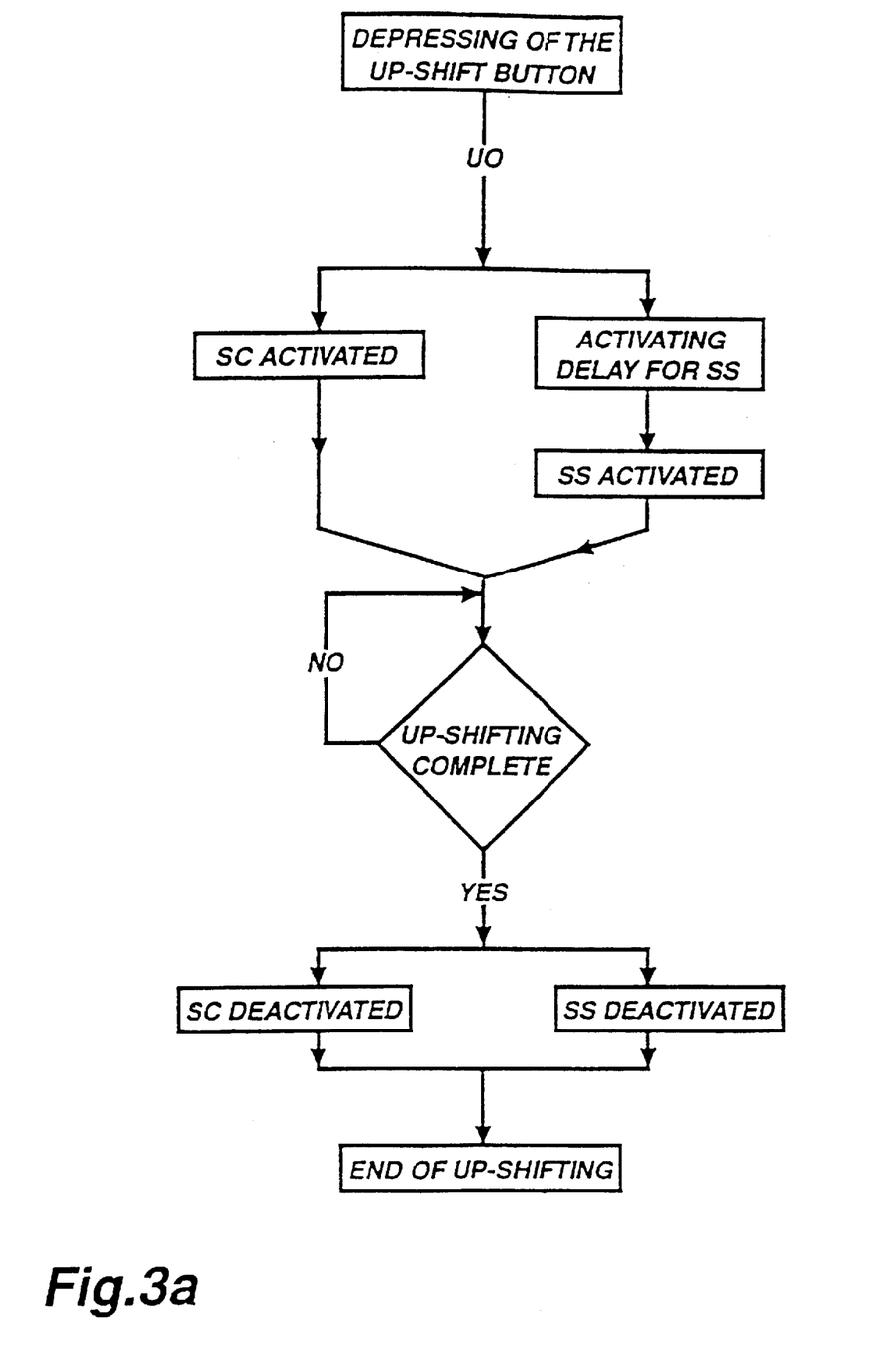
FIG. 3*a* is a flow chart illustrating an up-shift sequence for the semi-automatic transmission system.

The operation of a semi-automatic system constructed in accordance with the invention will be described hereinafter with reference to FIGS. 3 and 3a.

The engine 30 must have a certain minimum speed before it can run on its own power and develop a sufficiently high torque to drive the straddle type vehicle 8. Thus, to prevent power from being transmitted from the crankshaft 36 to the transmission clutch 54 at low rotating speeds, the centrifugal clutch 38 remains disengaged and when the operator increases the speed of the engine 30 the centrifugal clutch 38 is engaged automatically. As the rotational speed of the crankshaft 36 increases, the output torque of the crankshaft 36 is transmitted through the centrifugal clutch 38 and the transmission clutch 54 to the main shaft 42.

The clutch 54 is coupled with a gear 38a in a conventional manner. For example, the gear 38a is mounted on the main shaft 42 using bearings or bushings, such that the gear 38a can rotate relative to the main shaft 42. The gear 38a is connected to a clutch wall 54a that rotates with the gear 38a and at least one of a plurality of plates 54b of the clutch 54.

At least one of a plurality of plates 54c of the clutch 54 is fixedly coupled to the main shaft 42. The solenoid clutch SC valve causes coupling of the plates 54b and 54c. Rotational movement is transferred from the starting clutch 38 to the gear 38a, clutch wall 54a and at least one of the plates 54b. Coupling of plates 54b and 54c controls rotation of main shaft 42. The torque of the main shaft 42 is transmitted through the first speed gear $40_1$ and the secondary shaft 44 to the output shaft 46 to drive the output shaft 46.

Once the operator depresses the up-shift button, an input UO is generated and a SC (Solenoid-Clutch) is activated, such SC disengages the transmission clutch 54 to permit a smooth shifting. At the same time, after an activating delay, a SS (Solenoid-Shift) is also activated, such SS operates the shift drum 48 connected to the shift forks 52, such shift forks 52 then move in order to engage the second speed gear $40_2$. Obviously, the shifting occurs while the transmission clutch 54 is disengaged. Once the shift is complete, the SS has a return spring 51 for returning in a neutral position.

Shifting from second speed gear $40_2$ to third speed gear $40_3$; from third speed gear $40_3$ to fourth speed gear $40_4$; and from fourth speed gear $40_4$ to fifth speed gear $40_5$ operates in the same manner as that described above. Downshifting from n speed gear to n-1 speed gear also operates in the same manner except that an input DO is generated when the operator depresses the downshift button 28.

Figure 4:
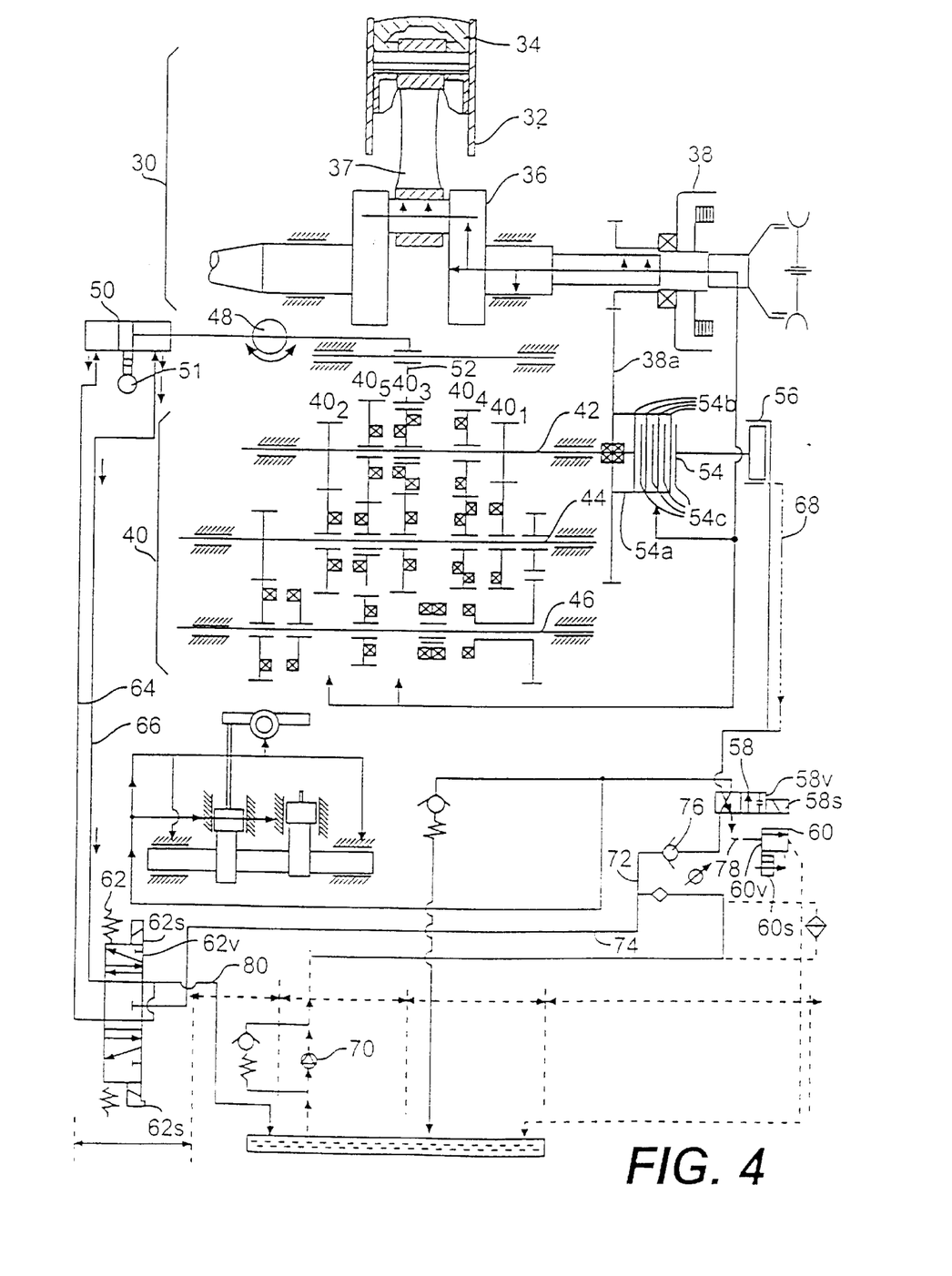
FIG. 4 is a diagrammatic view wherein a transmission system constructed in accordance with a variant is illustrated.

FIGS. 4 illustrates a diagrammatic view of a transmission system constructed in accordance with a variant. As described above, the centrifugal starting clutch 38 is mounted on a front end of the crankshaft 36. The shift drum 48 is connected to the shift forks 52 which are operated for changing the gear ratio of the transmission 40. The transmission 40 the first speed gear train $40_1$ to the fifth speed gear train $40_5$.

The multiple disk transmission clutch 54 which is activated by a transmission clutch actuator 56 is mounted on one end of the main shaft 42. A clutch valve-solenoid 58 with a pressure modulated valve-solenoid 60 mounted thereon is connected to the clutch actuator 56. The clutch valve-solenoid 58 comprises a valve 58V and a solenoid 58S and the modulated valve-solenoid 60 comprises a valve 60V and a solenoid 60S. A shift valve-solenoid 62 comprising a valve 62V and two solenoids 62S is connected to the shift actuator 50. The shift actuator 50 has a return spring 51 for maintaining it in a neutral position when it is not actuated.

Shift hoses 64 and 66 are installed between the shift actuator 50 and the shift valve-solenoid 62 and clutch hose 68 is installed between the clutch actuator 56 and the clutch valve-solenoid 58. A pump 70 provides pressurized oil to the clutch valve-solenoid 58 and the shift valve-solenoid 62 through a pressurized clutch hose 72 and a pressurized shift hose 74 respectively. A check valve 76 is installed on the pressurized clutch hose 72 between the pump 70 and the clutch valve-solenoid 58 in order to prevent any loss of pressure. The check valve 76 may however be omitted by selecting a return spring 51 having a load force which is higher than the clutch actuator operating pressure. A discharge clutch hose 78 which passes through the pressure modulated valve-solenoid 60 is mounted on the clutch valve-solenoid 58 and a discharge shift hose 80 is mounted on the shift valve-solenoid 62.

It is understood that the pump 70 may be an oil pump, which provides pressurized oil through the semi-automatic transmission system, may also prodiving lubrication to components located in the power unit 22. It is also understood that hoses 64, 66, 68, 72, 74 and 78 may be replaced by internal passages located in the power unit 22.

Figure 6:
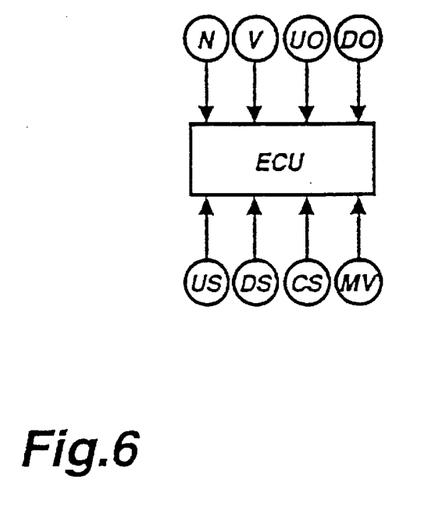
FIG. 6 is a diagrammatic view of an apparatus used in the semi-automatic transmission system.

FIG. 6 illustrates a preferred embodiment of controlling the clutch valve-solenoid 58 and the shift valve-solenoid 62 in a semi-automatic transmission system constructed in accordance with a variant, namely the ECU. A plurality of electrical signal inputs are provided to the ECU. An input N varies linearly with engine speed (RPM) (which may be measured from the rotation speed of the transmission clutch 54). An input V varies linearly with the vehicle speed (which may be measured from the rotation speed of the main shaft 42). Inputs UO and DO, vary according to an up-shift and a downshift command respectively.

One or more of the input signals to the ECU is\are used to generate four output signals: an output CS for actuating the clutch solenoid 58, outputs US and DS for actuating the shift solenoid and an output MV for controlling the modulated valve-solenoid 60.

Figure 4A:
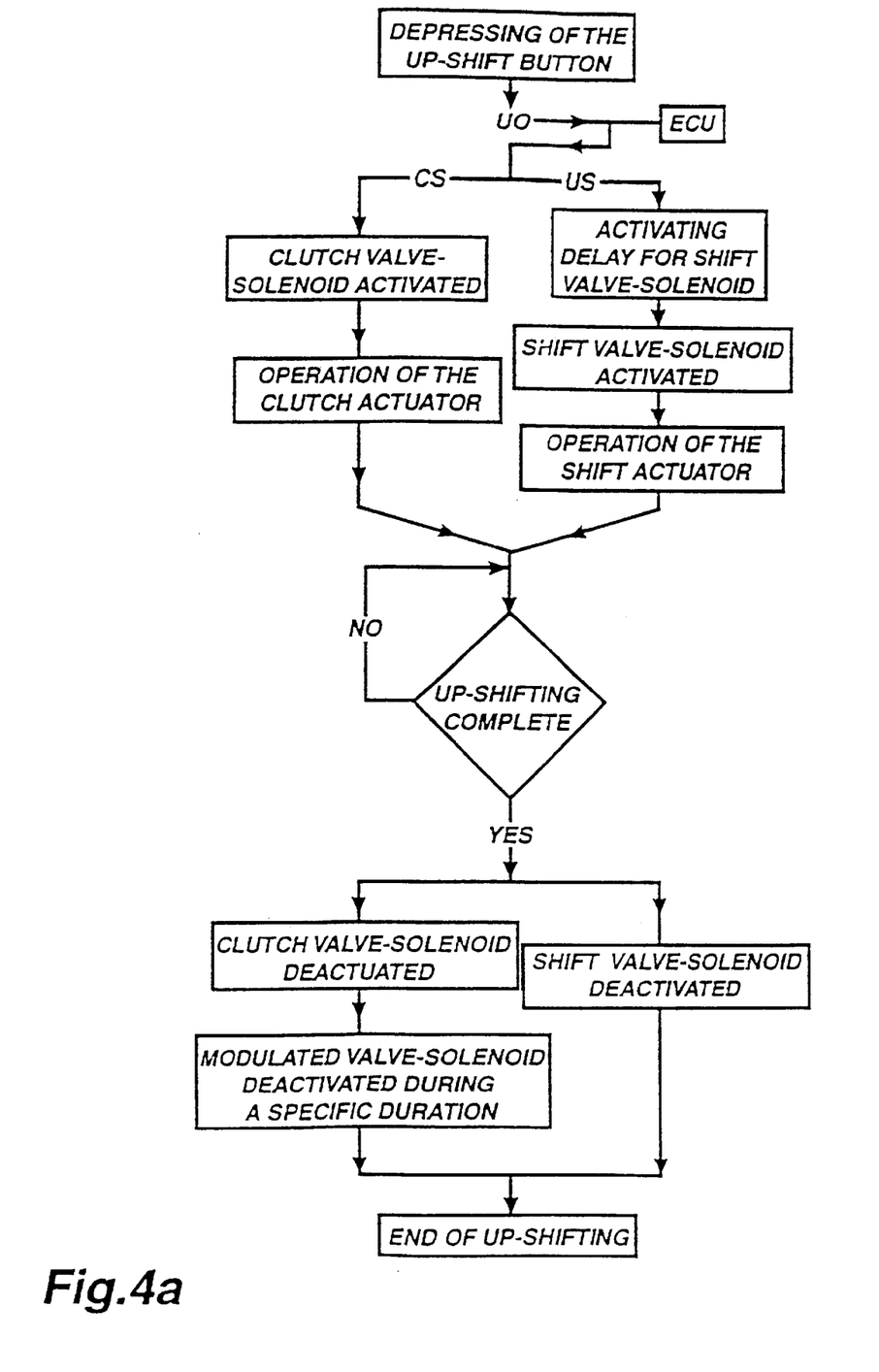
FIG. 4*a* is a flow chart illustrating an up-shift sequence for the semi-automatic transmission system illustrated in FIG. 4.

With reference to FIGS. 4 and 4a, the operation of the semi-automatic system will be described hereinafter.

With the first speed gear $40_1$ engaged and the semi-automatic transmission selected by the operator with the mode button 29, while the operator depresses the up-shift button 26, the up-shifting occurs as follows.

Input UO is read by the ECU, an output CS is generated and the clutch valve-solenoid 58 is then activated. The clutch valve-solenoid 58 permits the pressurized fluid located in the pressurized clutch hose 72 to pass through the clutch hose 68 for actuating the clutch actuator 56. In so doing, the clutch actuator disengages the transmission clutch 54 to permit a smooth shifting.

At the same time, output US is also generated by the ECU and, after an activating delay, the shift valve-solenoid 62 is also activated. The shift valve-solenoid 62 then permits the pressurized fluid located in the pressurized shift hose 74 to pass through the shift hose 66 for actuating the shifting actuator 50. The shifting actuator 50 activates the shift forks 52 which move in order to engage the second speed gear $40_2$. Obviously, the shifting occurs while the transmission clutch 54 is disengaged.

Once shifting is complete, the transmission clutch 54 must be re-engaged in order that the output torque of the crankshaft 36 is transmitted through the transmission clutch 54 to the main shaft 42 and the torque of the main shaft 42 is transmitted through the second speed gear $40_2$ and the secondary shaft 44 to the output shaft 46.

Thus, the ECU generates another output CS in order to deactivate the clutch valve-solenoid 58. In doing so, the clutch valve-solenoid 58 blocks the pressurized fluid from the pressurized clutch hose 72 and permits the fluid to drain from the clutch actuator 56 through the clutch hose 68, through the clutch valve-solenoid 58, through the discharge clutch hose 78 and through modulated valve-solenoid 60. Engagement of the transmission clutch 54 is then permitted but in order to permit a smooth engagement between the transmission clutch 54 and the main shaft 42, a certain amount of slippage is permitted during such engagement.

Indeed, it is understood that without any slippage between the transmission clutch 54 and the main shaft 42, a substantial gear shift shock may occur, specially if the operator simultaneously increases or decreases the engine speed in a substantial manner. The amount of slippage is thus controlled by the ECU through the modulated valve-solenoid 60 which controls the pressure of discharging of fluid; the lower the pressure during discharge is, the less the slippage.

Figure 5:
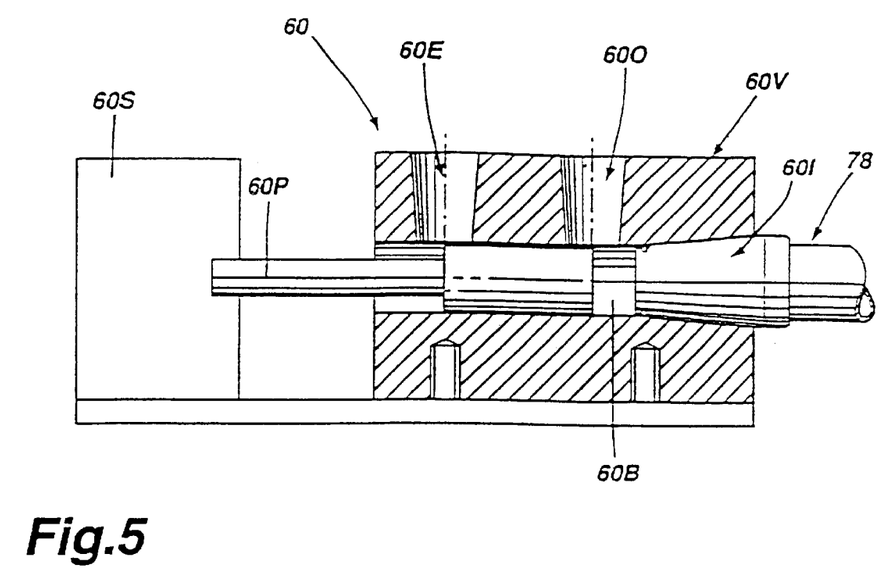
FIG. 5 is an enlarged side elevational view of a modulated valve-solenoid used in the invention wherein the valve is shown

More particularly, as illustrated in FIG. 5, the modulated valve-solenoid 60 includes the solenoid 50S and the valve 60V. The valve 60V has an inlet port 60I, an oulet port 60O, an extra port 60E and a valve bore 60B. A plunger 60P is operatively connected to the solenoid 60S, such plunger 60P is thus reciprocable in the bore 60B for controlling the port 60O. The port 60E prevents any loss or accumulation of fluid in the bore 60B.

In operation, the solenoid 60S has been activated once the up-shifting operation was begun and the plunger 60P prevents any flow of fluid from the discharge clutch hose 78 through the port 60O while the clutch valve-solenoid 58 is deactivated. For allowing a smooth re-engagement between the transmission clutch 54 and the main shaft 42, the ECU reads inputs N and V for determining the appropriate slippage. For example, the ECU may determine that the engagement of the transmission clutch 54 will be accomplished when the rotation speeds of the transmission clutch 54 and the main shaft 42 are in a synchronization value. The modulated valve-solenoid 60 is then subsequently monitored by the ECU in order to allow a specific pressure decrease rate during discharge. Indeed, the ECU, instead of controlling the solenoid 60S wherein the plunger 60P prevents any flow of fluid, the ECU operates the solenoid 60S in order that the plunger 60P being moved and allows fluid from the discharge clutch hose 78 to pass through the port 60O. The more important concept is the reduction of voltage. Lower pressure during discharge results in less slippage.

Shifting from second speed gear $40_2$ to third speed gear $40_3$; from third speed gear $40_3$ to fourth speed gear $40_4$; and from fourth speed gear $40_4$ to fifth speed gear $40_5$; operates in the same manner as that described above.

Figure 4B:
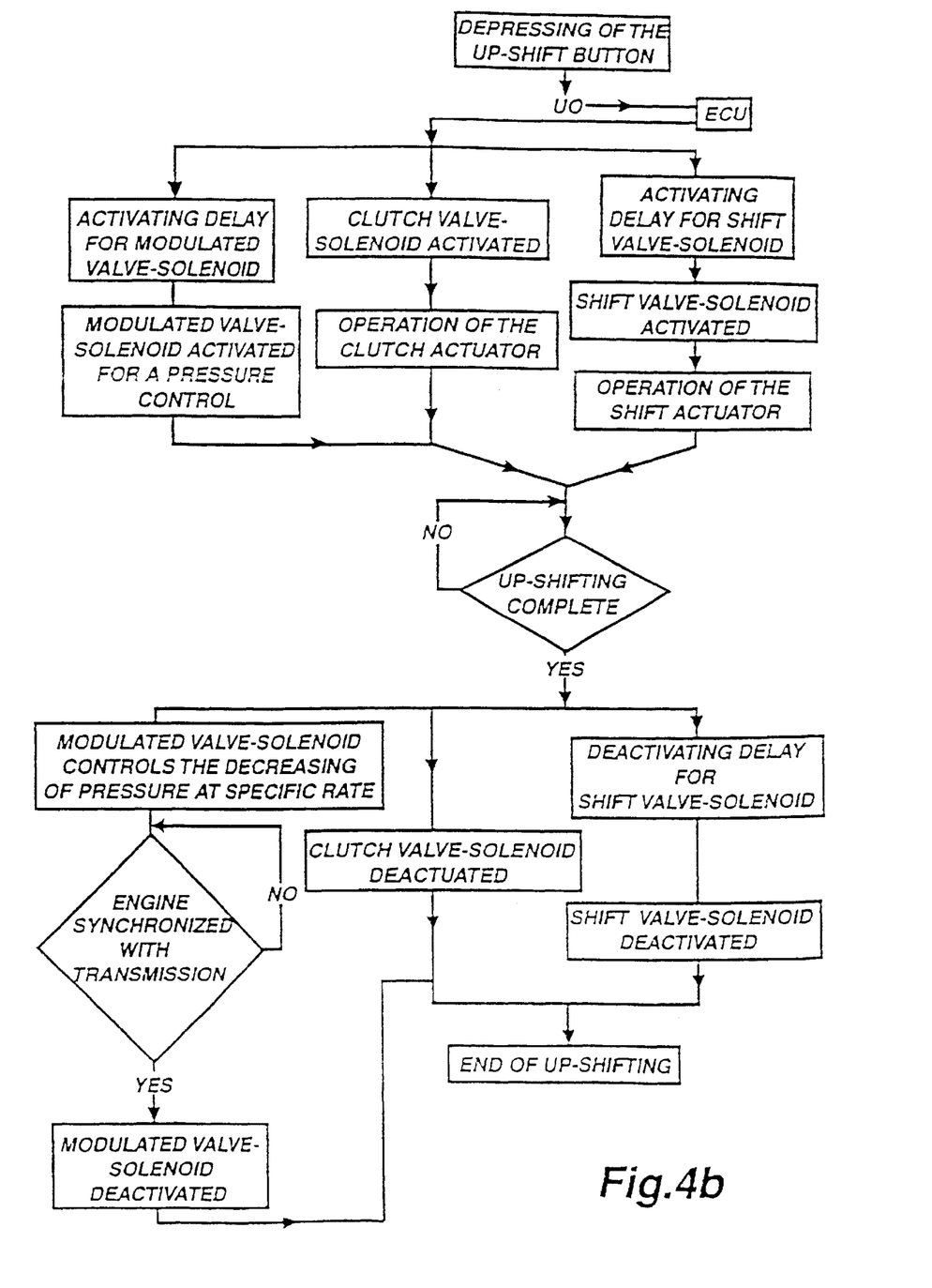
FIG. 4*b* is a flow chart illustrating another up-shift sequence for the semi-automatic transmission system illustrated in FIG. 4.

FIG. 4b illustrates another up-shift sequence which may be performed according to the present invention. This up-shift sequence is similar than the one illustrated in FIG. 4a but the modulated valve-solenoid 60 is here activated for a pressure control determined by the ECU. The modulated valve-solenoid 60 is thus activated after a short specific period of time in order that the plunger 60P prevents any flow of fluid from the discharge clutch hose 78 through the port 60O for creating such pressure control. Afterwards, the modulated valve-solenoid 60 will control the pressure of fluid in the clutch actuator 56 for monitoring the amount of slippage during the engagement between the transmission clutch 54 and the main shaft 42. A deactivating delay is also added for controlling the termination of operation of the shaft valve-solenoid 62.

Hence, in the up-shift sequence illustrated in FIG. 4b, instead of monitoring the modulated valve-solenoid 60 according to a specific duration of time as illustrated in FIG. 4a, the ECU monitors the modulated valve-solenoid 60 in accordance with V and N. The modulated valve-solenoid thus controls the pressure of fluid in the clutch actuator 56 which decreases at a specific rate as long as the rotation speeds of the transmission clutch 54 and the main shaft 42 are not in a synchronization value. Once synchronization occurs, the modulated valve-solenoid 60 is deactivated.

In the up-shift sequence illustrated in FIG. 4b, it is also possible to add an ignition timing retard which may be activated when the up-shift button is depressed. This ignition timing retard will only be deactivated once the engine is synchronized with the transmission at the end of the up-shifting operation.

Downshifting from fourth speed gear $40_4$ to third speed gear $40_3$ will be described hereinafter. While the operator depresses the downshift button 28, input DO is read by the ECU, an output CS is generated and the clutch valve-solenoid 58 is activated.

The clutch valve-solenoid 58 then permits pressurized fluid located in the pressurized clutch hose 72 to pass through clutch hose 68 to actuate the clutch actuator 56. In so doing, the clutch actuator disengages the transmission clutch 54 to permit a smooth shift.

At the same time, output DS is also generated and, after an activating delay, shift valve-solenoid 62 is also activated. Shift valve-solenoid 62 then permits the pressurized fluid located in the pressurized shift hose 74 to pass through the shift hose 66 for actuating the shifting actuator 50. The shifting actuator 50 then operates shift forks 52 which move in order to engage the third speed gear $40_3$. Obviously, downshifting occurs while transmission clutch 54 is disengaged.

Once downshifting is complete, the transmission clutch 54 must be re-engaged. The ECU thus generates another output CS in order to deactivate the clutch valve-solenoid 58. In doing so, the clutch valve-solenoid 58 blocks the pressurized fluid from the pressurized clutch hose 72 and permits the fluid to drain from clutch actuator 56 through the clutch hose 68, through the clutch valve-solenoid 58, through the discharge clutch hose 78, and through the modulated valve-solenoid 60. The engagement of the transmission clutch 54 is then permitted. As described above, the ECU allows a smoother downshift by controlling the amount of slippage between the transmission clutch 54 and the main shaft 42.

It is understood that the ECU used in the semi-automatic transmission system described above may have other inputs provided to it in order to improve such system. For example an input T which varies with the position of the shift forks 52 may be used. An input ST which varies with the position of the sub-transmission (HI, LO) may be used. An input A which varies with the throttle opening may be used. An input L may also be generated to the ECU, such input L may based on the input N (a predetermined maximum engine speed) and on the input A (a specific throttle opening) and such output L being used by the ECU wherein the ECU determines that the shifting operation is not appropriate and prevents such shifting operation. The input L may also be used by the ECU wherein the ECU activates a warning light to indicate to the operator that he has to up-shift. The ECU may also read the engine speed N when an input UO or DO is generated for determining if the clutch valve-solenoid 58 and the shift valve-solenoid 62 shall or shall not be activated. Finally, the ECU may also momentarily reduce the engine speed and/or power shifting occurs by altering the ignition timing, cutting the ignition or varying the fuel supply.

Operation of the automatic transmission system constructed in accordance with the invention will be described hereinafter with reference to FIGS. 6a, 7 and 7a.

Figure 6A:
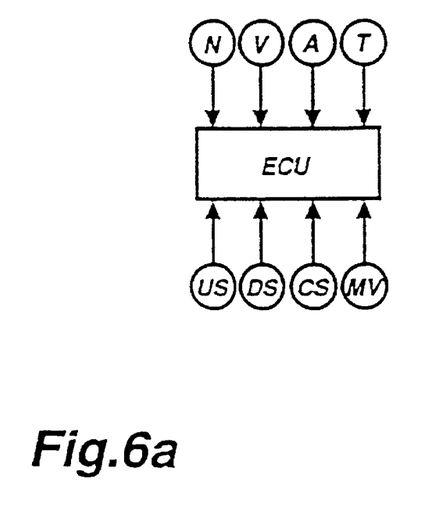
FIG. 6*a* is a diagrammatic view of an apparatus used in the automatic transmission system.
Figure 7:
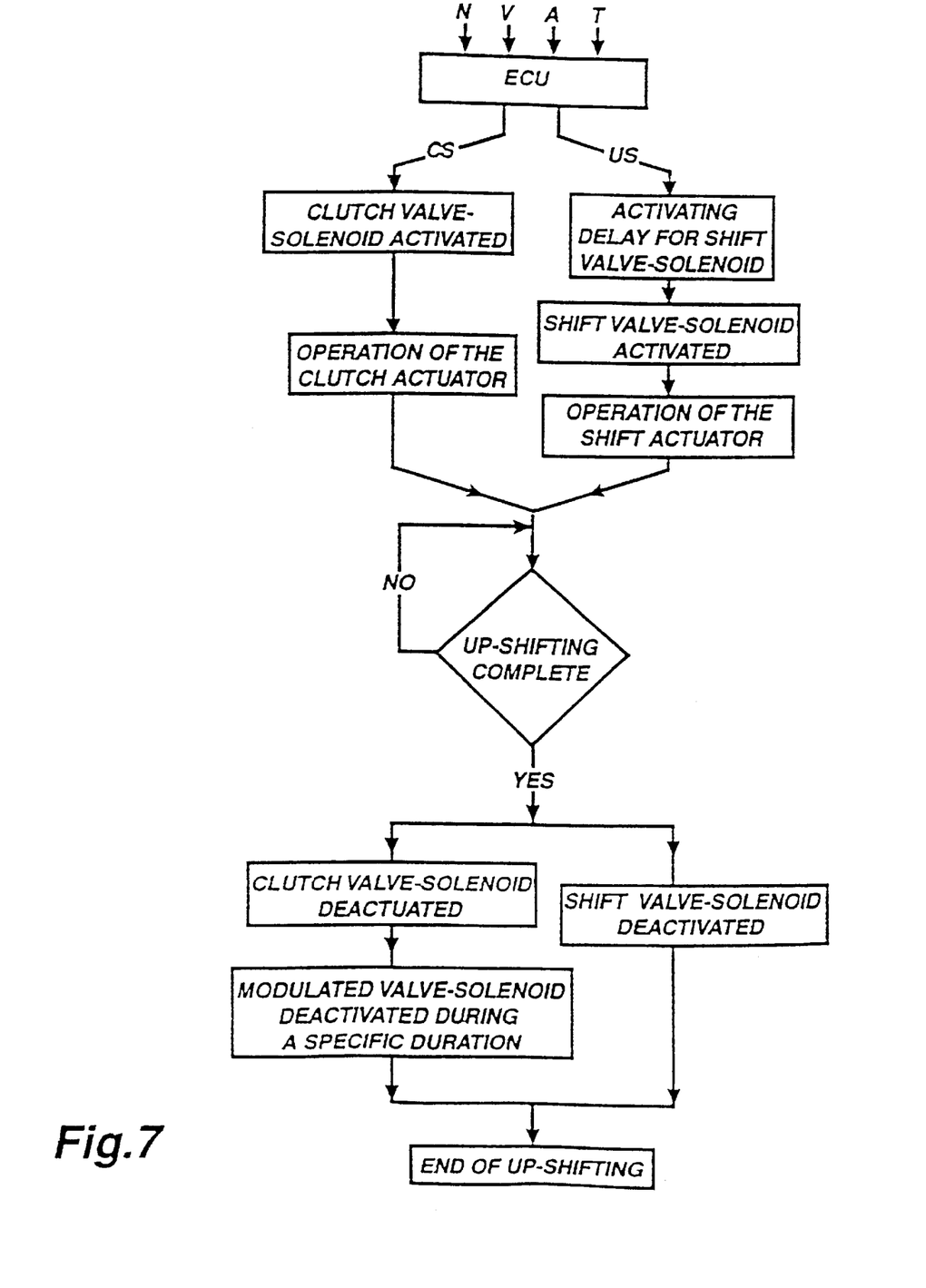
FIG. 7 is a flow chart illustrating an up-shift sequence for an automatic transmission system constructed in accordance with the invention.
Figure 7A:
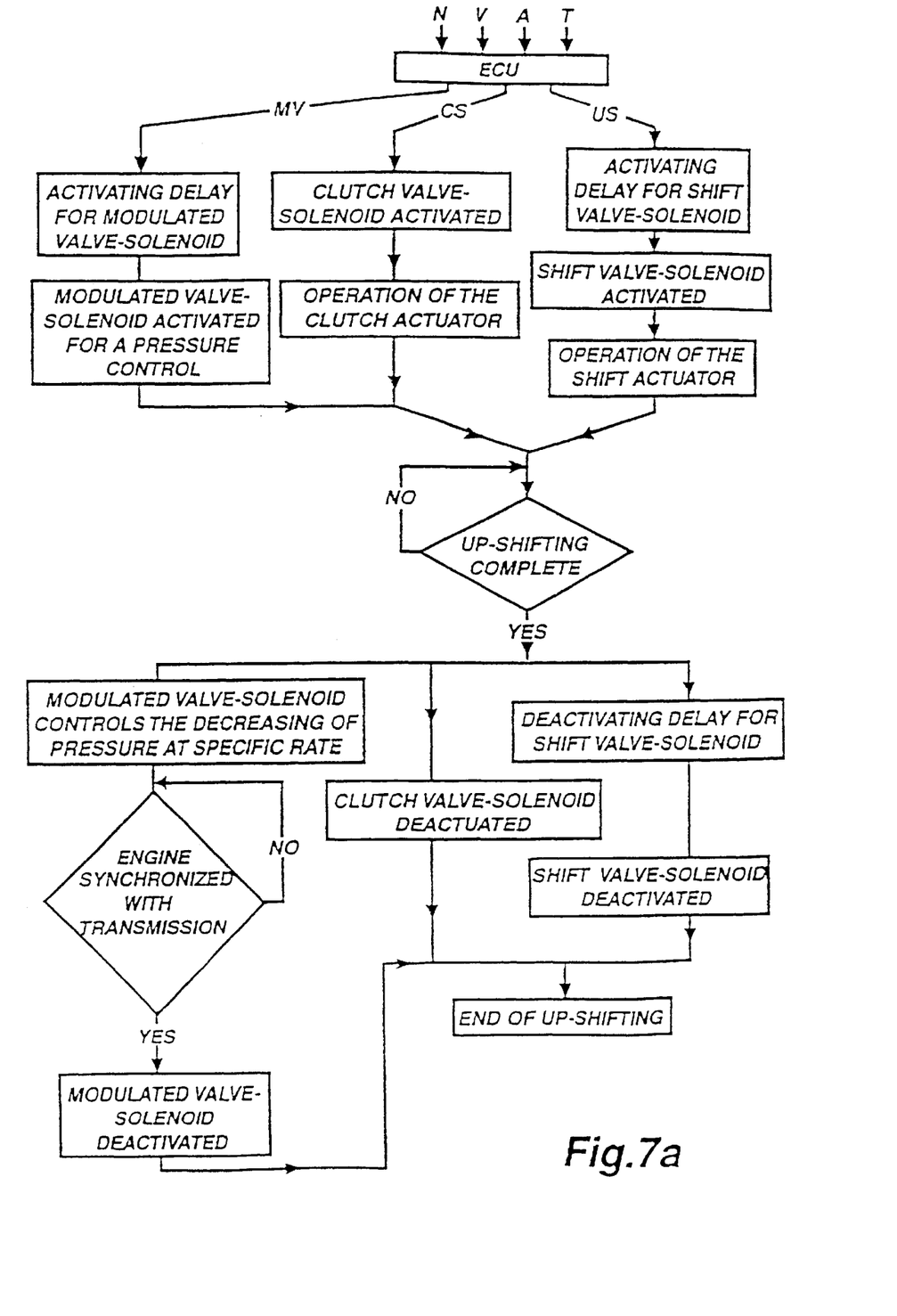
FIG. 7*a* is a flow chart illustrating another up-shift sequence for an automatic transmission system constructed in accordance with the invention In the drawings, the preferred embodiment of the invention is illustrated by way of example. It is to be expressly

FIG. 6a illustrates a preferred embodiment of a means for controlling the clutch valve-solenoid 58 and the shift valve-solenoid 62 in the automatic transmission system, namely the ECU. A plurality of electrical signal inputs are provided to the ECU. An input N varies linearly with engine speed (RPM). An input V varies linearly with the vehicle speed. An input T, varies with the position of the shift forks 52 and an input A, varies with the throttle opening.

One or more of the input signals to the ECU is\are used to generate four output signals: an output CS for actuating the clutch solenoid 58, outputs US and DS for actuating the shift solenoid and an output MV for controlling the modulated valve-solenoid 60. An output IT may also be generated for activating an ignition timing retard which only becomes deactivated once the engine is synchronized with the transmission at the end of the up-shifting operation.

Once the operator has selected the automatic transmission with the mode button 29, the sequence of operation is similar to the operation of the above semi-automatic transmission system constructed in accordance with the variant illustrated in FIG. 4 except that the switching mechanism 24 is not required, no inputs UO and DO are generated and the operator does not control the operation of the transmission 40 (shifting sequence may be similar to the one illustrated in FIG. 4a or 4b). In fact, the ECU determines the appropriate time for changing the transmission ratio in the automatic mode.

When the operator increases the speed of the engine 30, the centrifugal clutch 38 is engaged automatically as the rotating speed of the crankshaft 36 increases, and the output torque of the crankshaft 36 is transmitted through the centrifugal clutch 38 and the transmission clutch 54 to the main shaft 42. The torque of the main shaft 42 is transmitted through the first speed gear $40_1$ and the secondary shaft 44 to the output shaft 46 to drive the output shaft 46.

Once input T indicates transmission 40 is in first speed gear $40_1$, input N is sampled by the ECU. When input N indicates an engine speed between two predetermined engine speeds, input A indicates a throttle opening between two predetermined values and input V indicates a predetermined speed of the vehicle 8, the ECU generates an output CS and the clutch valve-solenoid 58 is activated.

The clutch valve-solenoid 58 then permits pressurized fluid located in the pressurized clutch hose 72 to pass through the clutch hose 68 for actuating the clutch actuator 56. In so doing, the clutch actuator disengages the transmission clutch 54 to permit a smooth shift. The shifting then occurs in the same manner described above for the semi-automatic transmission system constructed in accordance with the embodiment illustrated in FIG. 4.

Downshifting from fourth speed gear $40_4$ to third speed gear $40_3$ will be described hereinafter. Once input N indicates an engine speed between two predetermined engine speeds, input A indicates a throttle opening between two predetermined values and input V indicates a predetermined speed of the vehicle 8, the ECU generates an output CS and the clutch valve-solenoid 58 is activated. Downshifting will then occur in the same matter described above for the semi-automatic transmission system constructed in accordance with the variant illustrated in FIG. 4.

It is understood that the ECU used in the automatic transmission system described above may have other inputs provided to it in order to improve such system. For example an input ST which varies with the position of the sub-transmission (HI, LO) may be used. An input L may also be generated to the ECU, such input L may based on the input N (a predetermined maximum engine speed) and on the input A (a specific throttle opening) and such output L being used by the ECU to activate the clutch valve-solenoid 58 and the shift valve-solenoid 62 for up-shifting to the next speed gear.

It is understood that the pump 70 may be an oil pump, which provides pressurized oil through the automatic transmission system, may also prodiving lubrication to components located in the power unit 22. It is also understood that hoses 64, 66, 68, 72, 74 and 78 may be replaced by internal passages located in the power unit 22.

It is also understood that in the semi-automatic transmission system constructed in accordance with the variant illustrated in FIG. 4 and in the automatic system, the hydraulic components of the system may be eliminated. Indeed, the valves 58V, 60V, 62V and the shift actuator 50 and clutch actuator 56 may be replaced by activating and actuating means such as electric solenoids having the appropriate power.

The above description of the preferred embodiment should not be interpreted in any limiting manner since variations and refinements are possible which are within the spirit and scope of the present invention. The scope of the invention is defined in the appended claims and their equivalents.

We claim:

1. A semi-automatic transmission system for a straddle type vehicle which comprises a body frame supported by front and rear wheels, a seat supported above said frame and a power unit supported by said frame below said seat, said transmission system comprised in said power unit and includes:

a switch with an up-shift button and a downshift button mounted on a steering bar wherein, in operation, depression of said up-shift button generates an input UO and depression of said downshift button generates an input DO;

a friction-type transmission clutch mounted on one end of a main shaft of a transmission;

the transmission having at least first and second speed gear trains associated with the main shaft, wherein a shifter is mounted to shift from one of the first and second speed gear trains associated with the main shaft to another of the first and second gear trains associated with the main shaft;

a shift actuator in communication with said shifter;

a clutch actuator in communication with said transmission clutch;

wherein, in operation, when one of said inputs UO and DO is generated, said clutch actuator and said shift actuator are activated, wherein said transmission clutch is disengaged when the up-shift button or the downshift button is depressed and shifting is accomplished by said shifter; said shifter being moved and positioned to one of said first and second gear trains associated with said main shaft based on the generated input.

2. A semi-automatic transmission system as defined in claim 1, wherein said shift actuator and said clutch actuator are respectively a shift solenoid and a clutch solenoid.

3. A semi-automatic transmission system as defined in claim 1, wherein said shift actuator and said clutch actuator are respectively a shift valve-solenoid and a clutch valve-solenoid.

4. A semi-automatic transmission system as defined in claim 1, wherein said shift actuator is a hydraulic shift actuator; said system further including a shift valve-solenoid; said hydraulic shift actuator being activated by said shift valve-solenoid.

5. A semi-automatic transmission system as defined in claim 1, wherein said clutch actuator is a hydraulic clutch actuator; said system further including a clutch valve-solenoid; said hydraulic clutch actuator being activated by said clutch valve-solenoid.

6. A semi-automatic transmission system for a straddle type vehicle which comprises a body frame supported by front and rear wheels, a seat supported above said frame and a power unit supported by said frame below said seat, said transmission system comprised in said power unit and includes:

a switch with an up-shift button and a downshift button mounted on a steering bar wherein, in operation, depression of said up-shift button generates an input UO and depression of said downshift button generates an input DO;

a transmission clutch mounted on one end of a main shaft of a transmission;

the transmission having at least first and second speed gear trains, wherein a shifter is mounted to shift from one of the first and second speed gear trains to another of the first and second speed gear trains;

a shift actuator in communication with said shifter;

a clutch actuator in communication with said transmission clutch;

a modulated controller connected to the clutch actuator;

an Electronic Control Unit (ECU), connected to said shift actuator, said clutch actuator and said modulated controller;

wherein, in operation, an input N is provided to said ECU and is proportional to the speed of said engine, an input V is provided to said ECU which varies with speed of the vehicle and (a) while one of said inputs UO and DO is read by the ECU, said clutch actuator and said shift actuator are activated by said ECU, wherein said transmission clutch is disengaged while shifting is accomplished by said shifter; said shifter being moved and positioned to one of said first and second speed gear trains based on the generated input; and (b) said ECU reads said inputs N and V, deactivates said clutch actuator and said shift actuator, and activates said modulated controller, wherein an appropriate amount of slippage is permitted between said transmission clutch and said main shaft of said transmission during engagement of said transmission clutch.

7. A semi-automatic transmission system as defined in claim 6, wherein said shift actuator, said clutch actuator and said modulated controller are, respectively, a shift solenoid, a clutch solenoid and a modulated solenoid.

8. A semi-automatic transmission system as defined in claim 6, wherein said shift actuator, said clutch actuator and said modulated controller are, respectively, a shift valve-solenoid, a clutch valve-solenoid and a modulated valve-solenoid.

9. A semi-automatic transmission system as defined in claim 6, wherein said shift actuator is a hydraulic shift actuator, said system further including a shift valve-solenoid; said hydraulic shift actuator being activated by said shift valve-solenoid.

10. A semi-automatic system as defined in claim 6, wherein said clutch actuator is a hydraulic clutch actuator and said modulated controller is a modulated valve-solenoid; said system further including a clutch valve-solenoid; said hydraulic clutch actuator being activated by said clutch valve-solenoid with said modulated valve-solenoid mounted thereon.

* * * * *